Patented Jan. 7, 1941

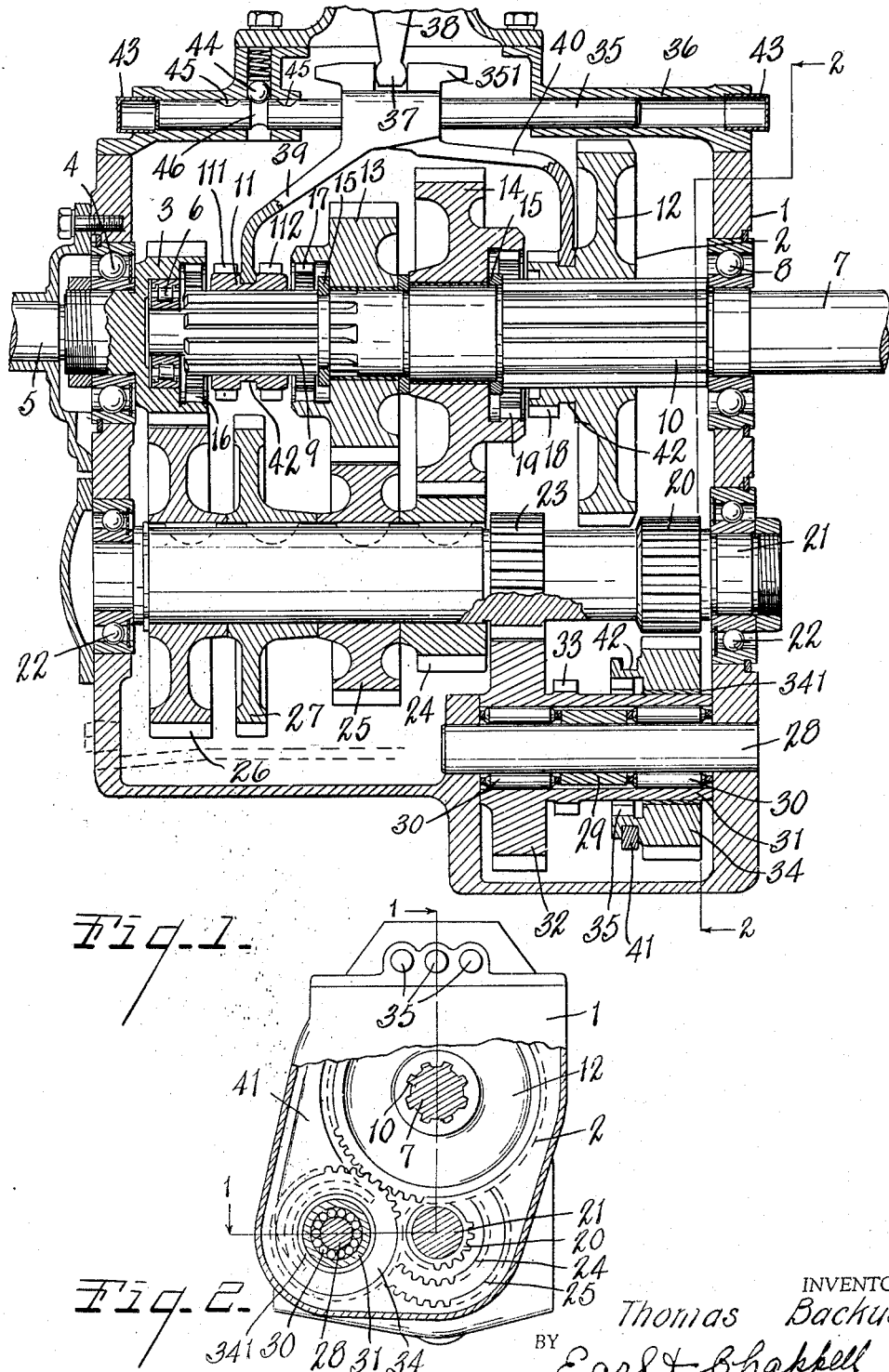

2,227,742

UNITED STATES PATENT OFFICE 2,227,742

TRANSMISSION

Thomas Backus, Kalamazoo, Mich., assignor to Fuller Manufacturing Company, Kalamazoo, Mich., a corporation of Michigan Application December 12, 1938, Serial No. 245,184

15 Claims. (Cl. 74—333)

This invention relates to improvements in transmissions.

The main objects of this invention are:

First, to provide a variable speed transmission for internal combustion engine driven vehicles, which is strong and compact in construction and economical of parts.

Second, to provide a transmission of the type described having a novel reverse drive assembly.

Third, to provide a transmission of the type described having reverse drive provisions which greatly reduce friction under load and facilitates the reverse gear shifting operation.

Fourth, to provide a reverse gear assembly for a variable speed transmission which is characterized by a minimum of friction under load, by the ease of manipulating the same, and by the compactness thereof.

Fifth, to provide a reverse gear idler assembly including a sliding gear and having provision for drivingly clutching and rotating the gear with a minimum of friction after it has been put in mesh with a gear to be driven thereby.

Objects relating to details and economies of the invention will appear from the description to follow. The invention is defined in the claims.

A structure embodying the features of my invention is illustrated in the accompanying drawing, wherein:

Fig. 1 is a fragmentary view in section along the broken line 1—1 of Fig. 2, illustrating details of the transmission.

Fig. 2 is an end view of the transmission of the invention with the housing thereof broken away and the mechanism in section on line 2—2 of Fig. 1.

Referring to the drawing, the reference numeral 1 indicates the housing of my improved transmission, which is generally designated 2. The front wall of the housing has the main driving gear 3 rotatably mounted therein in ball bearing 4. This gear is connected to the clutch controlled engine drive shaft 5 and it is provided with a suitable internal pilot bearing 6 for rotatably receiving the end of the main transmission or driven shaft 7.

The aforesaid driven shaft 7 is rotatably journaled in ball bearing 8 in the opposite housing wall and is adapted to be connected in known manner to the usual vehicle propeller shaft leading to the differential.

The splined portions 9, 10 of shaft 7 have slidably mounted thereon a clutch member 11 and a sliding gear 12 for effecting certain forward change speed operations to be described. The shaft 7 likewise has the gears 13, 14, freely rotatable thereon, but restrained from axial movement by the ring or collars 15 set in appropriate grooves in the shaft.

The clutch member 11 has toothed faces or elements 111, 112 thereon adapted to be selectively engaged respectively with internal clutch faces or members 16, 17 on the respective gears 3, 13, and the slidable gear 12 carries integral clutch teeth 18 adapted to engage the internal clutch face or member 19 on the gear 14 when the clutch 12 is shifted to the left as viewed in Fig. 1.

When shifted to the right, the gear 12 engages a low speed gear 20 fixed on the extreme right end of countershaft 21, which is rotatably mounted in roller bearings 22 in the housing. This countershaft, in addition to the low speed gear 20, has secured thereto the reverse idler engaging gear 23, the further forward speed gears 24, 25, 26 of increasing diameter and number of teeth in the order named, and the power take-off drive gear 27 from which the drive for a power take-off mechanism is taken in a well known manner.

The countershaft gears 24, 25, 26 are in constant mesh respectively with the gears 14, 13, 3.

From the foregoing description the manner in which the present transmission makes possible four forward speeds will be apparent. With gears 12, 20 in mesh, the driving train from the driver 5 to the main transmission shaft is as follows: Gears 3, 26, 20, and 12. This drives shaft 7 at low speed. For second speed, the clutch members 18, 19 on gears 12, 14 respectively are engaged to lock gear 14 to shaft 7 and the train is as follows: Gears 3, 26, 24, 14. For third speed, the clutch member 11 is engaged with internal clutch 17 on gear 13 to lock the latter to shaft 7, the train being gears 3, 26, 25, 13, and for high speed operation, the clutch 11 is engaged with gear 3 for direct drive of shaft 7 from the engine drive shaft 5. Other forward speeds may be attained by suitable further gear provisions, if desired.

The reverse drive assembly of my invention consists of a reverse idler shaft 28 which is fixedly mounted in housing 1 and has mounted thereon through the roller bearings 30 separated by spacer 29 an elongated idler sleeve 31. This sleeve has integrally formed thereon a gear 32 which is constantly in mesh with countershaft gear 23. The sleeve 31 also carries an integral set of clutch teeth 33. A reverse idler gear 34 has a bushing 341 secured thereto, which is loosely mounted on the sleeve 31 for free rotation thereon when not subject to load and for sliding movement axially thereof. Gear 34 carries integral internal clutch teeth 35 engageable with the sleeve clutch teeth 33 when gear 34 is shifted to the left. As clearly shown in Fig. 2, shiftable idler gear 34 meshes with the main shaft low speed gear 12 when shifted to the left as described. It will be observed with reference to Fig. 1 that gear 34 comes into mesh with the aforesaid gear 12 prior to the engagement of the respective clutch teeth 35, 33 on the gear 34 and sleeve 31, which insures that the gear engagement will be satisfactorily effected prior to the clutch engagement.

With the reverse idler gear 34 in mesh with gear 12 and clutched to sleeve 31, the driving train is of course gears 3, 26, 23, 32, 34, 12. Since the gear 34 and bushing 341 therein rotate with the roller bearing mounted sleeve 31, it is obvious that friction in the reverse driving train under load is cut down to an absolute minimum. Furthermore, any destructive frictional action between the sleeve and bushing, which might exist due to the difficulty of maintaining a film of oil between these parts under load, is prevented, since they rotate together. The aforementioned rotating sleeve and slidable reverse idler constitute an exceedingly compact and simplified reverse drive arrangement utilizing space in the transmission to the greatest advantage and eliminating the necessity of increasing the over-all length of the transmission to provide additional space for the reverse gearing. Thus, in the absence of the axially slidable feature, it would be necessary to lengthen the housing to afford space for an additional gear on means shaft 7 and the reverse gear coacting therewith, in order to effect reverse engagement without locking. This, of course, would substantially increase the length and weight of the housing.

The shifting provisions for my transmission consist of a plurality of rods 35 slidable in individual guide ways 36 in housing 1, each of which carries a shifter arm provided with a pair of upstanding ears or lugs 351 selectively engageable by the rounded end 37 of the gear shaft lever 38. There are three shifting arms and accordingly three sliding rods, the aforesaid arms being designated 39, 40, 41 and having forks or yokes engaging in annular grooves 42 in the clutch member 11, sliding gear 12, and the sliding reverse idler 34, respectively.

The reamed rod guide ways 36 are closed by hollow caps or plugs 43 and the locating of the slide rods 35 in gear engaging or neutral position is facilitated by a spring urged ball detent 44 engageable in notches 45 and an annular groove 46 formed in the respective rods.

I have illustrated and described my improvements in an embodiment which is very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent is:

1. A variable speed transmission comprising a housing, a driving gear rotatably mounted in said housing, a driven transmission shaft rotatably mounted in the housing, a gear angularly fixed and axially slidable on said shaft, a countershaft rotatably mounted in the housing, a gear on said countershaft in constant mesh with said first named driving gear, a further gear on said countershaft engageable by said angularly fixed driven shaft gear upon axial sliding movement of the latter to rotate the driven shaft in a forward direction and a reverse idler assembly comprising an idler engaging gear fixed on said countershaft, an idler shaft, an elongated sleeve having a gear continuously meshing with and driven by said last named gear, means for rotatably mounting said sleeve on said idler shaft, said sleeve having an integral toothed clutch member thereon, a reverse idler gear slidable axially and rotatable on said sleeve and having an integral toothed clutch member engageable with said sleeve clutch member by sliding movement of the idler on the sleeve to connect the idler and sleeve gears for rotation as a unit by said countershaft idler engaging gear, said idler gear being engageable and disengageable with said driven shaft gear by said axial sliding movement of the idler, and means for shifting said idler axially to engage the same with said driven shaft gear and effect clutching engaging of the sleeve and idler gear clutch members.

2. A variable speed transmission comprising a housing, a driven transmission shaft rotatably mounted in the housing and having a gear thereon angularly fixed and axially slidable, a countershaft having a gear thereon engageable by said last named gear upon axial sliding movement thereof for driving said transmission shaft in a forward direction, a further gear rotatably mounted in the housing, and a reverse idler assembly comprising an idler shaft, an elongated sleeve having a gear continuously meshing with and driven by said last named gear, anti-friction roller bearing means for rotatably mounting said sleeve on said idler shaft, said sleeve having a clutch member thereon, a reverse idler gear slidable axially and rotatable on said sleeve and having a clutch member engageable with said sleeve clutch member, said idler gear being engageable and disengageable with said driven shaft gear by axial sliding movement of the idler, and means for shifting said idler axially to engage the same with said driven shaft gear and effect clutching engaging of the sleeve and idler gear clutch members.

3. A variable speed transmission comprising a housing, a gear rotatably mounted in said housing, a driven transmission shaft rotatably mounted in the housing, a gear slidable on and angularly fixed to said driven shaft, a countershaft assembly rotatably mounted in the housing, including a gear in mesh with said first named gear, a gear adapted to be engaged by said driven shaft gear upon sliding movement of the latter, and a further idler engaging gear, and a reverse idler assembly comprising an elongated sleeve having a gear continuously in mesh with and driven by said countershaft idler engaging gear, anti-friction means for rotatably mounting said sleeve in said housing, said sleeve having a clutch member thereon, a reverse idler gear slidable axially and rotatable on said sleeve and having a clutch member engageable with said last named clutch member, said idler gear being meshingly engageable and disengageable with said driven shaft gear by axial sliding movement, and means for shifting said idler axially to engage the same with said driven shaft gear and to effect clutching engaging of the sleeve and idler gear clutch members.

4. A variable speed transmission comprising a housing, a gear rotatably mounted in said housing, a driven transmission shaft rotatably mounted in the housing, a gear slidable on and angularly fixed to said driven shaft, a countershaft assembly rotatably mounted in the housing, including a gear in mesh with said first named gear, a gear adapted to be engaged by said driven shaft gear upon sliding movement of the latter, and a further idler engaging gear, and a reverse idler assembly comprising a gear continuously in mesh with and driven by said countershaft idler engaging gear, anti-friction means for rotatably mounting said last named gear in said housing, said last named gear having a clutch member connected thereto, a reverse idler gear movable axially and rotatable relative to said last named gear and having a clutch member engageable with said last named clutch member, said idler gear being meshingly engageable and disengageable with said driven shaft gear by axial movement, means for mounting said reverse idler gear for axial movement, and means for moving said idler axially to engage the same with said driven shaft gear and to effect clutching engaging of the clutch members.

5. In a variable speed transmission including a countershaft and a main transmission shaft, each provided with a gear angularly fixed relative thereto, and means for driving said main shaft in reverse, comprising a fixed reverse idler shaft, a sleeve rotatable upon said shaft, said sleeve having an integral gear continuously in mesh with and driven by said countershaft gear, and an idler gear slidable axially and bushed for rotation on said sleeve, said sleeve and idler gear having cooperating clutch provisions engageable and disengageable by sliding movement of said idler whereby to drivingly connect the idler gear to the sleeve, said idler gear being engageable and disengageable with said main shaft gear by said sliding movement, and a further gear on said countershaft selectively engageable with said main shaft gear to drive the main shaft forward.

6. In a variable speed transmission including a housing and a countershaft and main transmission shaft rotatably mounted in the housing, said main shaft having a gear angularly fixed thereto, and means for driving said main shaft in reverse, comprising a sleeve, anti-friction means for rotatably mounting said sleeve in said housing including a roller bearing, a reverse driving gear on said countershaft, said sleeve having a gear secured thereto continuously in mesh with and driven by said countershaft gear, and an idler gear normally loose on said sleeve, said idler gear having an anti-friction bushing secured thereto and coacting with the sleeve to rotatably support the idler gear thereon when the idler is in inoperative position, said sleeve and idler gears having cooperating clutch provisions engageable and disengageable by relative sliding moving of said idler and sleeve gears whereby to drivingly connect the idler gear to the sleeve, said idler gear being engageable and disengageable with said main shaft gear by said sliding movement to actuate the main shaft in reverse.

7. In a variable speed transmission including a housing and a countershaft and main transmission shaft rotatably mounted in the housing, said main shaft having a gear angularly fixed thereto, and a gear on said countershaft selectively engageable with said gear to rotate the main shaft in forward direction, means for driving said main shaft in reverse, comprising a supporting member, means for rotatably mounting said supporting member in said housing, a reverse driving gear on said countershaft, said supporting member having a gear secured thereto and continuously in mesh with and driven by said countershaft reverse driving gear, and an idler gear normally loose on and supported by said supporting member, said idler gear being journaled on said supporting member through an anti-friction bushing, said supporting member and idler gear having cooperating clutch provisions engageable and disengageable by relative sliding moving of said idler and supporting member gears whereby to drivingly connect the idler gear to the supporting member, said idler gear being engageable and disengageable with said main shaft gear to actuate the main shaft in reverse.

8. In a variable speed transmission including a housing and a countershaft and main transmission shaft rotatably mounted in the housing, said main shaft having a gear angularly fixed thereto, and a gear on said countershaft selectively engageable with said gear to rotate the main shaft in forward direction, means for driving said main shaft in reverse, comprising a supporting member, means for rotatably mounting said supporting member in said housing, a reverse driving gear on said countershaft, said supporting member having a gear thereon continuously in mesh with and driven by said countershaft reverse driving gear, and an idler gear on and supported by said supporting member, said supporting member and idler gears having cooperating clutch members connected respectively thereto and engageable and disengageable by relative sliding moving of said idler and supporting member gears whereby to drivingly connect the same, said idler gear being engageable and disengageable with said main shaft gear to actuate the main shaft in reverse.

9. A reverse idler assembly for a variable speed transmission including a housing and a countershaft and main driven shaft each having an actuating gear thereon, and having means for driving said main shaft gear and main shaft from said countershaft for forward rotation of the main shaft, said assembly comprising a reverse gear meshing continuously with and driven by said countershaft gear, anti-friction means including a roller bearing for rotatably mounting said gear in said housing, an idler gear, bushing means for mounting said idler gear coaxially of said reverse gear and for free sliding and rotation relative thereto, said reverse and idler gears each having clutch means engageable by relative sliding movement of the reverse and idler gears, said idler gear being operatively engageable with said main shaft gear during said sliding movement to thereby effect reverse driving connection of the main shaft to the countershaft through said clutch means and gears.

10. A reverse idler assembly for a variable speed transmission including a housing and a countershaft and main driven shaft each having an actuating gear thereon, and a further gear on said countershaft engageable with the main shaft gear for driving the latter from said countershaft for forward rotation, said assembly comprising a reverse gear meshing continuously with and driven by said countershaft actuating gear, anti-friction means for rotatably mounting said gear in said housing, an idler gear, anti-friction means for mounting said idler gear coaxially of said reverse gear and for free sliding and rotation relative thereto, said reverse and idler gears each having clutch means engageable by relative sliding movement of the reverse and idler gears, said idler gear being operatively engageable with said main shaft gear to thereby effect reverse driving connection of the main shaft to the countershaft through said clutch means and gears.

11. A reverse idler assembly for a variable speed transmission including a housing and a countershaft and main driven shaft each having an actuating gear thereon, and a further gear on said countershaft engageable with the main shaft gear for driving the latter from said countershaft for forward rotation, said assembly comprising a reverse gear continuously meshing with and driven by said countershaft actuating gear, means for rotatably mounting said gear in said housing, an idler gear, means for mounting said idler gear for free sliding and rotation relative to said reverse gear and for engagement and disengagement with said main shaft gear, said reverse and idler gears having driving means engageable by relative sliding movement, said idler gear being operatively engageable with said main shaft gear to thereby effect reverse driving connection of the main shaft to the countershaft.

12. In a transmission including a main shaft, a countershaft, and a gear slidable on said main shaft, a gear on said countershaft engageable with said main shaft gear to drive the transmission in forward direction, and means for driving the transmission in reverse direction, comprising a sleeve having a reverse gear thereon in continuous mesh with a further gear on said countershaft, an idler gear freely slidable and rotatable on said sleeve, and anti-friction means including roller bearings for rotatably supporting said sleeve in the transmission, said idler being slidable axially on said sleeve for meshing engagement and disengagement with said main shaft slider gear and said reverse and idler gears having means drivingly connecting the same for rotation as a unit when the idler is engaged with the main shaft slider gear, said idler being free to rotate on said sleeve when not so engaged.

13. In a transmission including a main shaft, a countershaft, and a main shaft slider gear, a gear on said countershaft engageable with said main shaft gear to drive the transmission in forward direction, and means for driving the transmission in reverse direction, comprising a sleeve having a reverse gear driven continuously from said countershaft, an idler gear, anti-friction means mounting said idler gear for free axial sliding and rotation on said sleeve, and anti-friction means for rotatably supporting said sleeve in the transmission, said idler being slidable axially on said sleeve for meshing engagement and disengagement with said main shaft slider gear and said reverse and idler gears having means drivingly connecting the same for rotation as a unit when the idler is engaged with the main shaft slider gear, said idler being free to rotate on said sleeve when not so engaged.

14. In a transmission including a main shaft, a countershaft, and a main shaft slider gear, a gear on said countershaft selectively engageable with said main shaft gear to drive the transmission in forward direction, a further gear driven by the countershaft, and means for driving the transmission in reverse direction, comprising a reverse gear driven continuously from said further countershaft-driven gear, an idler gear, and anti-friction means for rotatably supporting said reverse gear and idler in the transmission and for mounting the idler for free rotation and axial movement relative to the reverse gear, said idler being slidable axially relative to the reverse gear for meshing engagement and disengagement with said main shaft slider gear and said reverse and idler gears having means drivingly connecting the same for rotation as a unit when the idler is engaged with the main shaft slider gear, said idler being rotatable relative to the reverse gear when not so engaged.

15. In a transmission, a main shaft, a countershaft, a gear non-rotatably connected to said main shaft, a gear on said countershaft engageable with said main shaft gear to drive the transmission in forward direction, a further gear driven by said countershaft, and means for driving the transmission in reverse direction, comprising a reverse gear driven continuously from said further countershaft-driven gear, an idler gear, and anti-friction means for rotatably supporting said reverse gear and idler in the transmission and for mounting the idler for free rotation and axial movement relative to the reverse gear, said idler being slidable axially relative to the reverse gear for meshing engagement and disengagement with said main shaft gear, and said reverse and idler gears having means drivingly connecting the same for rotation as a unit when the idler is engaged with the main shaft gear, said idler being rotatable relative to the reverse gear when not so engaged.

THOMAS BACKUS.